United States Patent [19]

Yamada et al.

[11] Patent Number: 4,898,023
[45] Date of Patent: Feb. 6, 1990

[54] APPARATUS FOR DETECTING INTERNAL PRESSURE OF A CAN

[75] Inventors: Morio Yamada; Yoshihiko Kimura, both of Yokohama, Japan

[73] Assignee: Toyo Seikan Kaisha, Ltd., Tokyo, Japan

[21] Appl. No.: 192,026

[22] Filed: May 9, 1988

[30] Foreign Application Priority Data

May 18, 1987 [JP] Japan .................. 62-118884

[51] Int. Cl.$^4$ ............................ G01M 3/36
[52] U.S. Cl. ............................ 73/52; 73/41
[58] Field of Search ............... 73/49.3, 52, 824, 818, 73/774, 865.8, 41, 45.4

[56] References Cited

U.S. PATENT DOCUMENTS

| | | | |
|---|---|---|---|
| 2,407,062 | 9/1946 | Darrah | 73/41 |
| 4,024,956 | 5/1977 | Cassidy | 73/57 |
| 4,117,718 | 10/1978 | Hayward | 73/52 |

FOREIGN PATENT DOCUMENTS 59-157357 9/1984 Japan .
6315538 9/1984 Japan .

Primary Examiner—Hezron E. Williams
Attorney, Agent, or Firm—Armstrong, Nikaido, Marmelstein, Kubovcik & Murray

[57] ABSTRACT

An apparatus for detecting internal pressure of a can has a reaction detector comprising two sets of fixed members and load cells arranged slightly narrower than the outside diameter of a can body and in a slightly different spaced apart from each other and a buckling detection sensor for detecting a displacement of the center of a cover. The reaction detector and the buckling detection sensor are mounted on a frame adjustable in position according to the kind of cans to be tested. The can is made to pass between two fixed members and load cells while being held by side retaining belts provided along the conveyor while being prevented from rotation. The same part of a can body is forced with different amounts of force and the reaction at that time is measured and converted into internal pressure of the can. The internal pressure of a can is thus measured accurately by this apparatus even if there are deviations in the roundness of the can body. The cover buckling detection sensor detects a can having an excessively high internal pressure which gives rise to buckling.

4 Claims, 4 Drawing Sheets

APPARATUS FOR DETECTING INTERNAL PRESSURE OF A CAN

BACKGROUND OF THE INVENTION

1. Field of the Invention

The present invention relates to an apparatus for detecting internal pressure of a can, and more particularly to an apparatus for detecting internal pressure suitable for detecting internal pressure of a can formed of a relatively soft material for cans such as aluminum cans, plastic cans and the like.

2. Description of the Prior Art

For the purpose of saving material and reducing cost, there have been recently widely used cans formed of a soft material such as metal cans formed of a thin metal material such as aluminum, plastic cans, etc., as cans for beverages and other foods. These cans are low in strength. Therefore, in the case of carbonated beverages, carbon dioxide gas is sealed into a can, and in the case of non-carbonated beverages, liquefied inert gas such as liquid nitrogen is sealed into a can to generate internal pressure thereby maintaining the strength of a can. For this reason, in the can producing line using the aforementioned can materials, it is particularly important in terms of quality control to conduct inspection if internal pressure of a can is properly secured.

In the past, as a method for measuring internal pressure of a can of this kind, a method for detecting internal pressure of a can has been known which utilizes the fact that a forced amount of a can body and reaction are in a correlation therebetween in a specific range according to internal pressure of a can whereby a can is slightly forced to measure reaction at that time to detect internal pressure of a can. However, the can body is not always circular in section completely due to an error in manufacture, and therefore, in such a case, even if the can body is pressed with the same forced amount, the substantial forced amount is sometimes differentiated to produce an error in measurement. To overcome this problem, the present inventors have proposed an apparatus in which a can body is transported without being rotated between two rolls which are slightly narrower than the outside diameter of the can body and arranged in a slightly different spaced relation, the can body is forced with different amounts of force at the same location, the reaction is measured by each of two load cells, a difference between measured values thereof is converted into an internal pressure to detect internal pressure of a can. (Japanese Patent Laid-Open No. 157,537/1984). The aforementioned apparatus is based on the principle in which the proportional relation of the forced amount of the can body and the reaction is that the higher the internal pressure of a can, the greater the proportional coefficient, and therefore, if the forced amount of the can body at the same location is varied to obtain the respective reaction and the difference thereof is converted into the internal pressure, the error in measurement caused by the error in manufacture is offset even if an error in manufacture is present in the can body whereby accurate internal pressure can be measured.

The measuring apparatus as described above has a detector for displacement of an end cover. This detector for displacement of a lid provided on the apparatus reads detection data at the same time-intervals from said detector during the passage of a can under the detector, compares and arithmetically operates average data at a seam band portion and data in the central portion, and detect a difference between a line connecting upper surfaces of both seam bands for the end cover and the central portion of the cover to thereby measure a displacement of the cover.

The apparatus as proposed above is made possible to detect internal pressure with high accuracy in the wide range of a combination of detection of internal pressure by reaction and a displacement type internal-pressure detector exhibiting a good resolution at a high pressure portion.

However, the apparatus as proposed above has no adjusting means which can simply respond to a change of kind of a can to be measured.

In addition, the detection for displacement of a cover was provided to detect a difference between the line connecting the upper surfaces of the seam bands in the outer periphery of the cover and the central portion of the lid, and therefore, in the case of the easy-open can, it is affected by the direction of an open tab. Furthermore, in detection of reaction of the aforementioned detector, as shown in FIG. 8, a rotating roll 26 is pressured against a can body, and reaction transmitted through a rotational shaft 27 is detected by a load cell 19. Therefore, the aforesaid detector requires a mechanism for maintaining the rotational shaft of a roll in a vertical attitude and a slide mechanism for transmitting a load to a load cell without deflection, and a spline shaft 28 is employed to meet such demand. As the result, in said detector, the weight of the slide portion increases; when the overhung increases, smooth slide operation is difficult to obtain; and the slide resistance varies. Furthermore, since the processing accuracy of the rotational portion is normally approximately 5/100 (mm), when the can is pressed by the rotational mechanism, a difference of 0.05 at the maximum occurs in the forced amount. The distance between the gauge surface of the load cell and the contact point increases, and the expansion of parts due to heat cannot be ignored. These factors result in an error in value of measurement, influencing on the discriminating accuracy.

SUMMARY OF THE INVENTION

It is an object of the present invention to provide an apparatus for detecting internal pressure of a can, which has a unit for measuring internal pressure of a can for detecting reaction to measure internal pressure of a can and a buckling detector for detecting a displacement of a cover, said unit and said detector being made integral to provide a compact structure, and which can be simply adjusted to a change in kind of cans.

It is a further object of the present invention to provide an apparatus for detecting internal pressure of a can, which can detect buckling simply and positively.

It is another object of the present invention to provide an apparatus for detecting internal pressure of a can, which can overcome an error in measurement caused by slide resistance of a load cell contact, thermal expansion, processing accuracy and the like.

The above described objects may be achieved by an apparatus for detecting internal pressure of a can featurized in claim 1 in accordance with the present invention and in dependent claims in the form of more advantageous form.

In the apparatus for detecting internal pressure of a can according to the present invention, a can is held by a side retaining belt for prevention of rotation provided along a conveyor, and moved into and between a fixed member and a load cell while being prevented from rotation to have its body portion pressed, reaction thereof being measured by the load cell. Subsequently, the can moves into and between a fixed member and a load cell installed in slightly spaced apart from the former, the same part being pressed and the reaction being likewise measured by the load cell. The same part is measured with the forced amount varied whereby even if an error in diameter of a can body is present, internal pressure can be measured with accuracy.

A contact of a load cell is formed into an elliptic dome having a long diameter in a height direction of a can and having a short diameter in a moving direction, the contact coming into slide contact with the can body to directly transmit a load to a load cell gauge surface. Accordingly, there requires no mechanism for maintaining a rotational shaft in a vertical attitude and a slide mechanism as required in prior art, and therefore, an error in measurement caused by slide resistance and oscillation of a contact is completely eliminated, and in addition, an error in measurement caused by thermal expansion and processing accuracy is materially reduced. Furthermore, there is eliminated an eccentric load exerting on the gauge surface when a can is caught between the contact and the fixed member due to the aforementioned configuration. Moreover, there occurs no hollow in the can body; holding of a can is smoothly carried out, and the maximum load at the time of pressing can be measured accurately. With the improvement in the load cell contact, the measuring accuracy can be enhanced about three times of prior art.

When the can body passes through and between the first set of a fixed member and a load cell and reaches a position where the foremost end of the can body is detected by a can position detector, the center of a cover is positioned directly below the buckling sensor. If the buckling sensor is actuated at said timing, the displacement of the central portion of the cover can be detected, and even the easy-open can, the displacement can be detected accurately without being disturbed. Accordingly, directivity of a can due to a tab position need not be taken into consideration an encountered in a conventional displacement detector.

Since spacing between a fixed member and a load cell, and spacing between can-body retaining belts and a position of a buckling center can be adjusted, response can be made simply to the change in diameter and height of a can body. Accordingly, adjustment can be made even if the kind of cans is different, and the apparatus can be easily applied to inspection for internal pressure of various cans in the can producing line.

DETAILED DESCRIPTION OF THE PREFERRED EMBODIMENT

Figure 1:
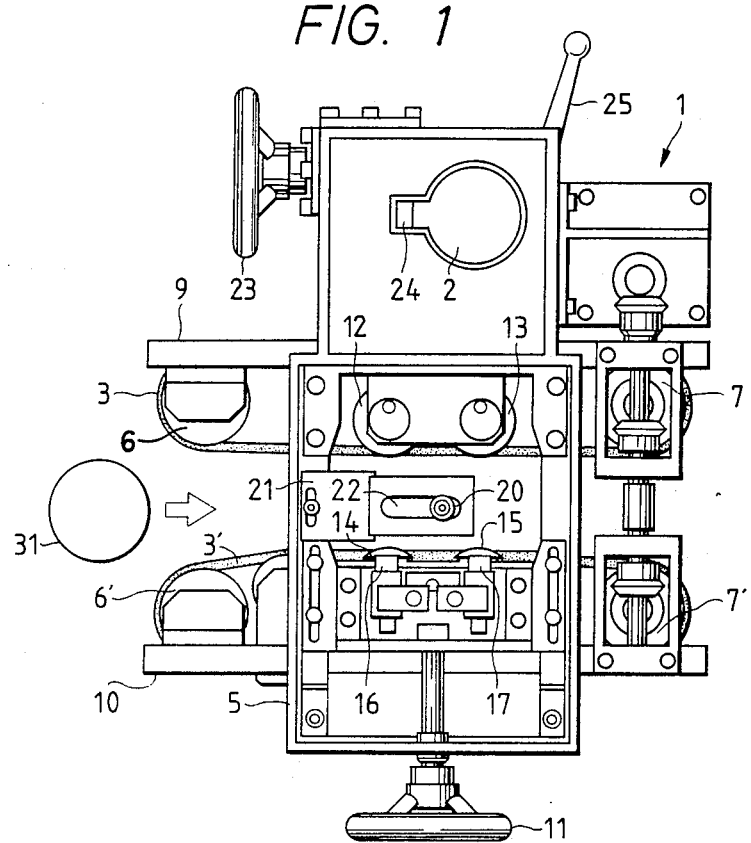
FIG. 1 is a plan view of the apparatus according to the present invention.
Figure 2:
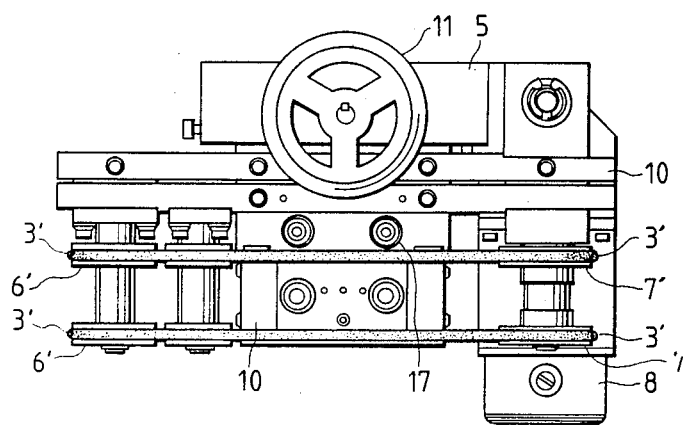
FIG. 2 is a front view of the apparatus according to the present invention.
Figure 3:
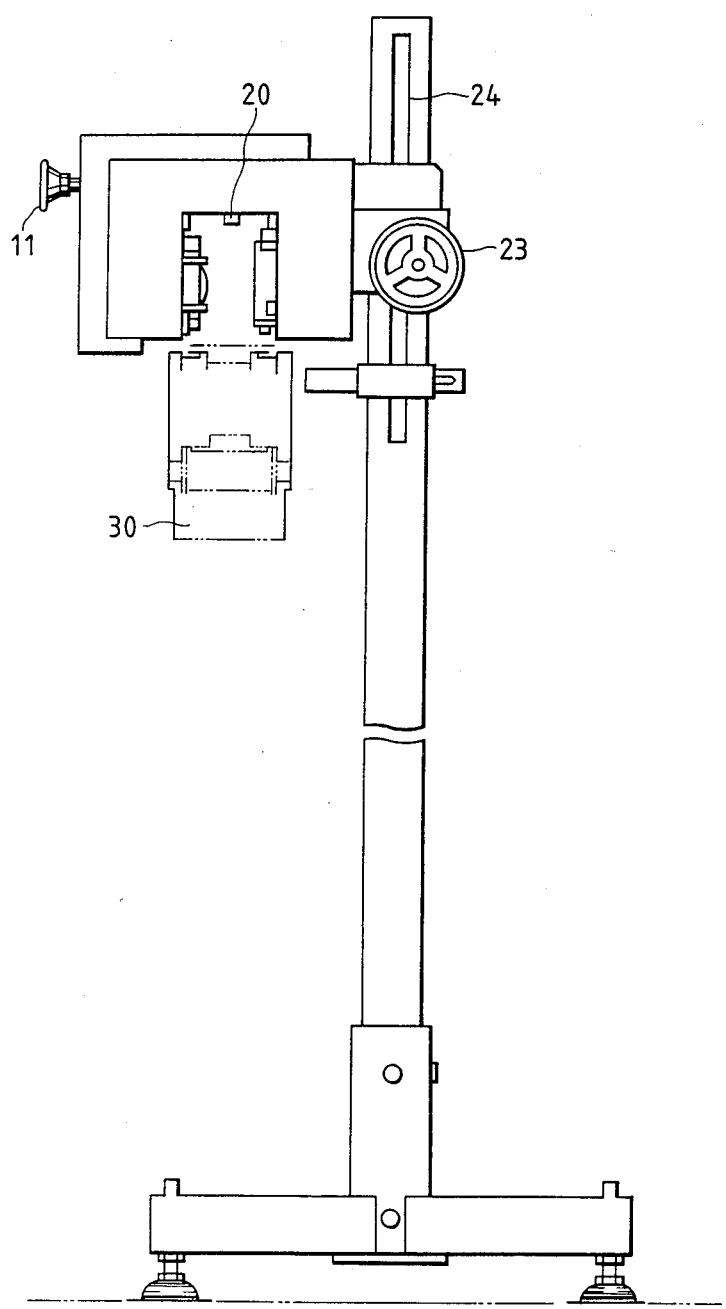
FIG. 3 is a side view showing the state wherein the apparatus of the present invention is set to the can producing line.

FIG. 1 shows one embodiment of an apparatus for detecting internal pressure of a can according to the present invention. In this figure, reference numeral 1 designates a detector body, which is provided so that it may be adjusted to be moved up and down by a rack and pinion mechanism on a pole 2 stood upright by the side of a can conveying conveyor 30 (FIG. 3) of the can producing line.

Figure 4:
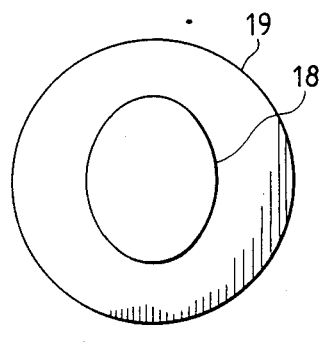
FIG. 4 is a front view of a load cell of the apparatus according to the present invention.
Figure 5:
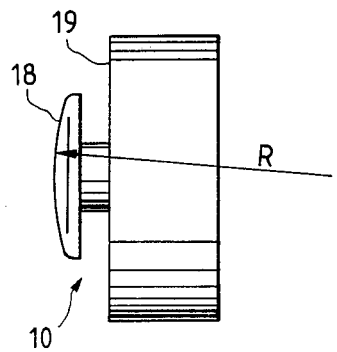
FIG. 5 is a side view of the same.
Figure 6:
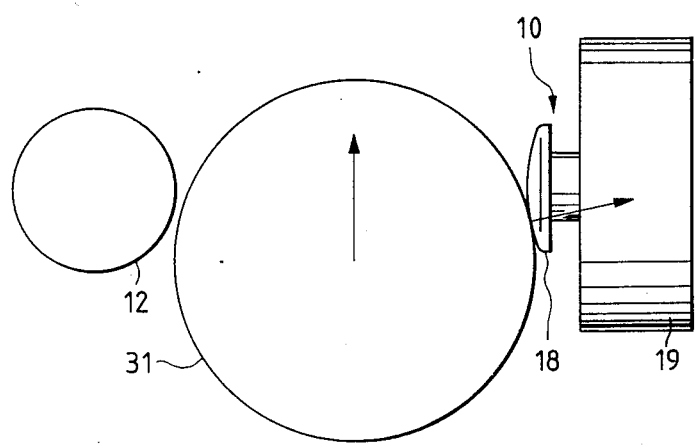
FIG. 6 is a plan view showing the state wherein reaction is measured.
Figure 7:
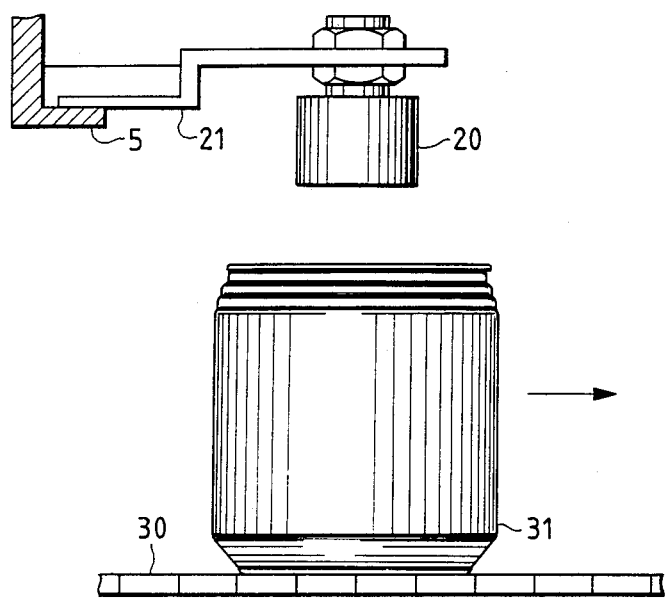
FIG. 7 is a schematic front view of a buckling detection portion of the apparatus according to the present invention.
Figure 8:
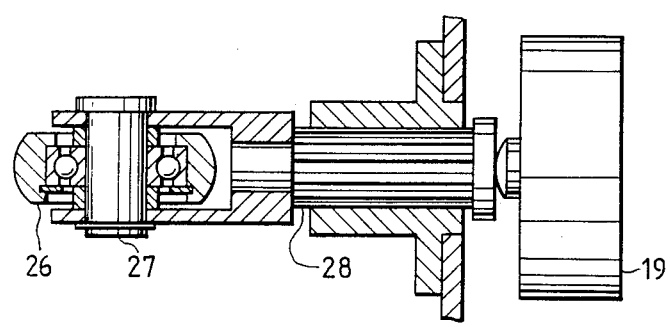
FIG. 8 is a side view of a load cell contact in a conventional apparatus.

Reference numerals 3, 3' designate side retaining belts for preventing of rotation for conveying a can while holding a body of the can during inspection of internal pressure without rotating the can. The belts, 3, 3' are extended between a pair of upper and lower pulleys 6, 7 and 6', 7' supported on support frames 9, 10 provided on a body frame 5 so that they may be adjusted in spacing and provided along the conveyor. The pulleys 7, 7' are rotated and driven by a motor 8 to rotate the side holding belt for prevention of rotation in synchronism with the conveyor. Reference numerals 12, 13 designate two sets of fixed rolls in a reaction measuring portion. The aforesaid fixed rolls constitute fixed members, and the roll is rotatable but the shaft is fixed and not moved. The fixed members are desirably rolls but plate-like members whose surface is smooth can be arranged along the conveying path. Reference numerals 14, 15 are load cells provided opposedly each other with the aforesaid fixed rolls and the conveying path put therebetween. The load cells 14, 15 are constructed such that a contact 18 is directly mounted on a load cell body 19 having a distortion gauge, as shown in FIGS. 4 to 6. The contact 18 is formed into an elliptic dome which has a long diameter in a height direction of the can and a short diameter in a can moving direction, for the following reason.

Reaction obtained by pressing a can body is proportional to an area of a can body slightly deformed if the forced amount is constant, and generally proportional to internal pressure of a can. Since this deformed area is substantially coincided with the contact area, the reaction is proportional to the product of internal pressure of a can and contact area. Therefore, an area of a contact is preferably large in order to increase a gain of reaction to the internal pressure. However, when the contact is increased in the moving direction of the can, an eccentric load when a can is caught is applied to a load cell, whereby a diaphragm with a distortion gauge mounted oscillates in a S-letter fashion, thus sometimes failing to obtain the true maximum load and increasing an error in measurement. For this reason, the contact is made into an elliptic shape which height has a long diameter in a direction of a can and a short diameter in a can or belt moving direction as described above. The surface of the contact has a large radius of curvature in height direction so as not to produce a hollow in the can body, and is made to have a small radius curvature so as to accurately obtain the maximum load in the moving direction and so as to provide smooth catching of the can, thus obtaining an elliptic dome configuration as a whole.

The spacing between the fixed roll and the load cell contact in each set is slightly narrower than the outside diameter of the can but the spacing between the roll 12 and the load cell 14 is somewhat narrowed as compared with the spacing between the roll 13 and the load cell 15. Reference numerals 16, 17 designate can detection sensors provided directly above the load cells 14, 15. The can detection sensor 15 also serves as a timing sensor for a buckling sensor which will be described later. The aforementioned belt 3', pulleys 6', 7', load cells 14, 15 and can detection sensors 16 17 are respectively provided on the supported frame 10 and are integrally moved by operation of a width adjusting handle 11, and the width of the can conveying path can be adjusted according to the size of the diameter of the can body of a can.

Reference numeral 20 designates a buckling sensor which comprises, for example, a displacement gauge of an electromagnetic induction loss type, provided to be positioned upwardly in the center between the retaining belts through a bracket 21 on the body frame 5. The buckling sensor is slidably provided in a slot 22 of the bracket 21 so that when the can detection sensor 17 detects the foremost end of the can body with respect to cans having various diameters of a can body, the center of the can is positioned directly below the buckling sensor 20 to detect a displacement of the center of the cover. In the figure, reference numeral 23 designates a vertically movable handle, 24 a rack formed on the pole 2, and 25 a lock lever used to lock the detection apparatus to the pole 2.

With the apparatus of the present embodiment constructed as described above, internal pressure of the can is measured in the procedure as follows:

The can having been conveyed from the previous step by the conveyor is held by the side retaining belts 3, 3' for prevention of rotation provided along the conveyor 30, moved into and between the fixed roll 12 and the contact of the load cell 14 while being prevented from rotation, and pressed in its body, the reaction thereof being measured by the load cell 14. The output of the load cell 14 is retained by a peak retaining circuit in a control circuit not shown, for example, according to a detection signal of the can detection sensor 16, an analog multiplexer is switched and the output is subjected to A/D conversion and read in CPU.

Subsequently, the can is moved into and between the fixed roll 13 and the contact of the load cell 15 installed in a different spaced relation from the former, the same part being pressed and the reaction being likewise measured by the load cell 15. Since the distance between the fixed roller 12 and the load cell 14 is different from that between the fixed roller 13 and the load cell 15, the reaction force detected by the load cell 13 is different from that by the load cell 15. The output of the load cell 15 is likewise retained at peak when the can detection sensor 17 is turned ON, and read in CPU after A/D conversion, which is subtracted from the output of the load cell 14 previously stored, converted into pressure and compared with a preset allowable internal pressure. If it is outside the allowable range, a reject signal is issued. In the present embodiment, the same part is measured with forced amount varied, and internal pressure can be accurately measured even if an error is present in diameter of a can.

The can detection section 17 also serves as a timing switch for the buckling sensor 20. When the foremost end of the can body is detected by the can detection sensor 17, the buckling sensor 20 detects a position of the center of the cover, and CPU arithmetically operates a displacement with respect to the set value to judge acceptance or rejection. If the displacement is outside the allowable range, a reject signal is issued. When the reject signal is issued, a rejector not shown is actuated to reject a can with deffective internal pressure from the can conveyor outside the line. Since the buckling sensor 20 detects the center position of the cover without fail at timing of the can detection sensor 17, the displacement can be accurately detected, even the easy-open can, without being disturbed by the tab. Accordingly, the directivity of the cover due to the tab position need not be taken into consideration as encountered in the conventional displacement detector.

In the case of a can different in diameter of a can body, the handle 11 is operated to simultaneously adjust a spacing between the belts and a spacing between the fixed roll and the contact of the load cell and at the same time adjust a position of the buckling sensor 20. In the case of a can different in height of a can, the vertically movable handle 23 is operated whereby the height position of the measuring device to the can conveyor 30 can be simply adjusted. As described above, even if the kind of cans is different, adjustment can be made simply, and the apparatus can be easily applied to the inspection of internal pressure of various cans in the can producing line.

What is claimed is:

1. An apparatus for detecting internal pressure of a cylindrical can, comprising:

a pair of first and second belt conveyors for feeding said cylindrical can without causing the rotation thereof by holding the cylindrical side thereof therebetween, said first and second belt conveyors being arranged in parallel to each other with a first clearance smaller than a diameter of said cylindrical can;

a first sensor means for detecting a reaction force of said cylindrical side, said first sensor means having a first fixed member and a first load cell arranged with a second clearance therebetween slightly smaller than said diameter of said can;

a second sensor means for detecting a reaction force of said cylindrical side, said second sensor means having a second fixed member and a second load cell arranged with a third clearance therebetween slightly smaller than said diameter of said can and different from said second clearance, said first and second sensor means being arranged in that sequence along said first clearance between said first and second belt conveyors and each of said first and second load cells having a can contact with an outer surface of an elliptic dome configuration which has a long diameter in a height direction of the can and a short diameter in a can moving direction;

a pair of support frames, one of said frames supporting one of said pair of first and second belt conveyors, and said first and second fixed members and the other frame supporting the other pair of said first and second belt conveyors, and said first and second load cells;

adjusting means for adjusting a distance between said pair of support frames;

a buckling sensor means for detecting a deflection of a cover of said can at a central point thereof, said buckling sensor means being adjustably positioned between said first and second belt conveyors;

a timing sensor means for operating said buckling sensor when said central point of said can is positioned directly below said buckling sensor by detecting a foremost portion of said can;

a calculation means for converting a difference between a maximum reaction force detecting by said first sensor means and a maximum reaction force detected by said second sensor means into an internal pressure of said can; and a comparing means for comparing said deflection detected by said buckling sensor with a predetermined allowable value.

2. An apparatus for detecting internal pressure of a can according to claim 1, wherein said timing sensor means is one of said first and second reaction force detection sensor means.

3. An apparatus for detecting internal pressure of a can according to claim 1, wherein said buckling sensor means is positioned between said first and second sensor means.

4. An apparatus for detecting internal pressure of a can according to claim 1, wherein said buckling sensor means is adjustably attached to one of said pair of frames.

* * * * *